(No Model.)
G. W. KNAPP.
MEASURE.
No. 325,842. Patented Sept. 8, 1885.
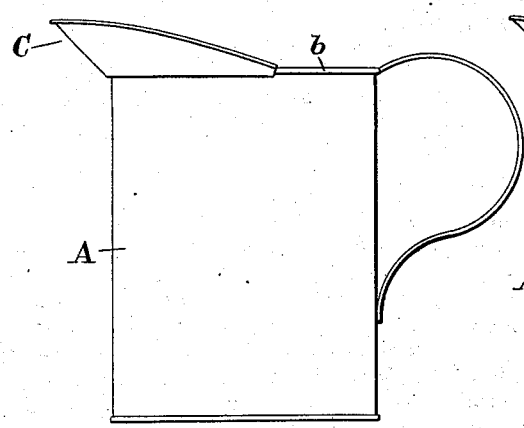
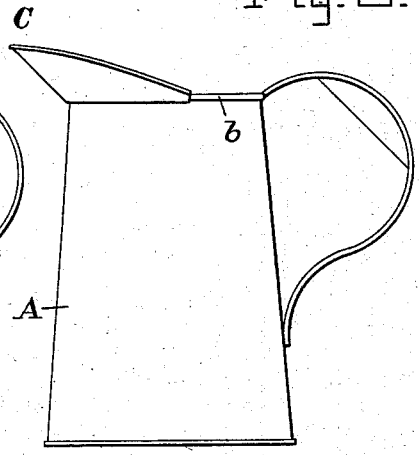
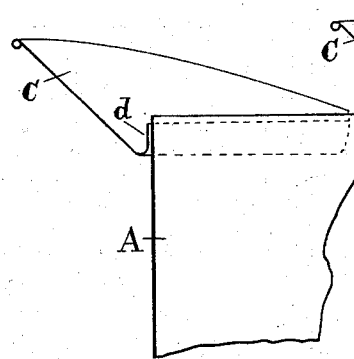
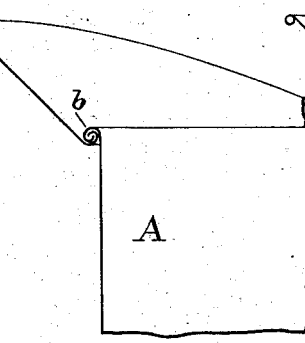
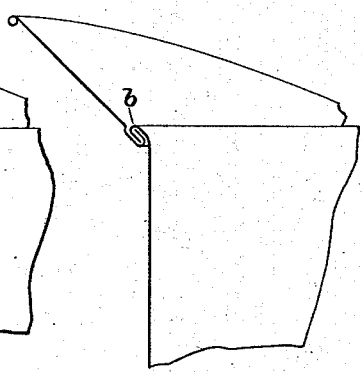
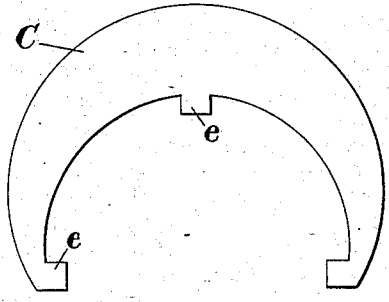
Witnesses:
A. E. Eader
John E. Morris
Inventor:
Geo. W. Knapp
By Chas B. Mann
Attorney

UNITED STATES PATENT OFFICE.

GEORGE W. KNAPP, OF BALTIMORE, MARYLAND.

MEASURE.

SPECIFICATION forming part of Letters Patent No. 325,842, dated September 8, 1885.

Application filed July 17, 1885. (No model.)

*To all whom it may concern:*

Be it known that I, GEORGE W. KNAPP, a citizen of the United States, residing at Baltimore, in the State of Maryland, have invented a certain new and useful Improvement in Measures, of which the following is a specification.

My invention relates to an improvement in attaching lips to measures made of sheet metal. The object of the invention is to provide measures having lips attached by inclosing the edge of the lip in the beaded rim of the measure, whereby, as the lip is not dependent on solder, its becoming heated, for instance, when set upon a hot stove, will have no damaging effect.

The invention is illustrated in the accompanying drawings, in which Figures 1 and 2 are side views, showing the improved lip on two measures, having, respectively, a straight and a tapered body. Fig. 3 is a sectional view of a lip and part of the body of a measure, showing the form of said parts and the position they take with respect to each other at the time they are about to be united. Fig. 4 is a vertical section, showing the finished condition of the lip and that part of the measure where it is attached. Fig. 5 is also a vertical section, showing a modification in the joint or uniting part of the lip and measure. Fig. 6 is a view of a lip separate, showing a modification in its form.

Heretofore measures made of sheet metal—such as tin-plate and sheet-copper—have had their lips attached generally by a mere soldered seam, the lower edge of the lip being fitted to the measure-body under the beaded rim and solder applied thereto above or below the lip. In some cases the lip has been riveted to the body, and solder also applied. This last way, while stronger than the first mentioned, required the application of solder to make a joint that would not leak. By my invention the lip is not only strongly united to the body without the use of rivets, but it will not leak, even though no solder is used.

The walls of the measure-body A may be vertical or inclined. The top rim of the wall is turned over or coiled into a hollow beaded edge, $b$, of the usual form. The lip C has its edge or some part of it inclosed in the beaded edge of the body, and this mode of attaching the lip constitutes the invention.

Previous to attaching the lip, its lower edge is turned up, as at $d$, Fig. 3. This is done by a suitable die, which will be readily understood by any one skilled in the art. The turned-up edge $d$ is then placed in position against the measure-body A, as shown in Fig. 3, and the top edge of the said body is coiled over outward, by the employment of well-known means, to form the usual beaded edge, $b$, and in so doing the turned-up edge $d$ of the lip is coiled or inclosed in the beaded edge, and when finished has the position shown in Fig. 4. When the lip is thus attached, no solder is required, neither are rivets necessary; and if the measure be set upon a hot stove the lip will not become detached. While solder is not essential to this lip, it may, of course, be applied if desired.

That part of the coiled top rim of the measure-body where the edge of the lip is inclosed may be flattened, as in Fig. 5, if desired.

Instead of inclosing the entire length of the lower edge of the lip in the beaded rim, the lip may be made as shown in Fig. 6—that is, with two or three tangs, $e$, which are to be turned up, as shown in Fig. 3, and said tangs coiled in or inclosed with the beaded rim. Thus the requisite strength is obtained, and the lip will not drop off when heat is applied; but in this latter case solder may be used advantageously to prevent leaking.

Having described my invention, I claim and desire to secure by Letters Patent of the United States—

A measure made of sheet metal, having its top rim turned over to form a beaded edge, and provided with a lip, some part of which is inclosed in the said beaded edge, as set forth.

In testimony whereof I affix my signature in presence of two witnesses.

GEORGE W. KNAPP.

Witnesses:
 JNO. T. MADDOX,
 JOHN E. MORRIS.